Feb. 16, 1926.
J. BIERMANNS
1,573,624
PROTECTIVE SYSTEM
Filed Feb. 21, 1925
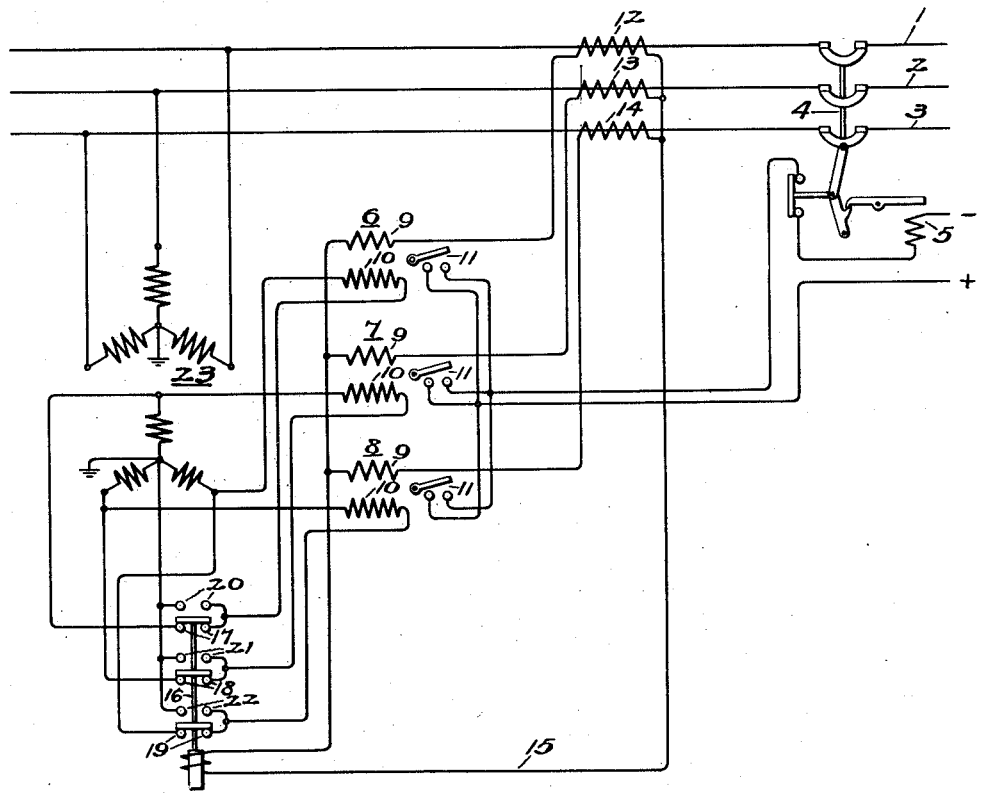
Inventor:
Josef Biermanns,
by Alexander S. Lime
His Attorney.

Patented Feb. 16, 1926.

1,573,624

UNITED STATES PATENT OFFICE.

JOSEF BIERMANNS, OF KARLSHORST, GERMANY, ASSIGNOR TO GENERAL ELECTRIC COMPANY, A CORPORATION OF NEW YORK.

PROTECTIVE SYSTEM.

Application filed February 21, 1925. Serial No. 10,975.

*To all whom it may concern:*

Be it known that I, JOSEF BIERMANNS, a citizen of Germany, residing at Karlshorst, Germany, have invented certain new and useful Improvements in Protective Systems, of which the following is a specification.

My invention relates to improvements in protective systems for electric circuits and more particularly to improvements in protective systems involving the use of relays in which current and potential windings cooperate to provide a discriminating time action, directional action, or both, and an object of my invention is to provide a simplified protective system having improved operating characteristics.

Abnormal circuit conditions causing excess currents influence one or more of the potentials of an electric system and consequently in protective systems involving the use of relays which have cooperating current and potential windings and which are to function with a discriminating action dependent on the potential and current, it is essential that at least one relay be energized in accordance with the current and the potential most affected. With ungrounded electric systems, this may be accomplished by providing at the desired points of the system a group of relays, one for each phase conductor having its current winding in series relation therewith and its potential winding connected to be energized in accordance with the potential between this conductor and another conductor. If, however, the system is grounded through a neutral point it is possible, in order to provide protection against faults between any conductor and ground as well as between any two conductors, to provide another group of relays, one for each conductor having its current winding in series relation therewith and its potential winding connected to be energized in accordance with the potential to ground of this conductor. This involves an undesirable complication and burden for the system to be protected by doubling the number of relays and increasing the cost, inasmuch as relays involving cooperating current and potential windings for discriminating action are relatively complicated and costly in comparison with simple overcurrent relays.

An object of my invention is to provide an improved protective system wherein relays whose discriminating action is dependent on current and potential can be energized selectively in accordance with the current and potential best adapted to insure the desired discriminating action both on faults between a conductor and ground and also on faults between two or more conductors, and wherein the number of relays is substantially reduced.

My invention will be better understood from the following description taken in connection with the accompanying drawing and its scope will be pointed out in the appended claims.

The single figure of the accompanying drawing illustrates diagrammatically a protective system embodying my invention as applied to a three phase electric circuit comprising conductors 1, 2 and 3 and arranged to be controlled by a circuit breaker 4 having a trip coil 5. The circuit comprising conductors 1, 2 and 3 has a neutral point, not shown, which may be grounded either directly or through an impedance.

For controlling the circuit breaker 4 through the trip coil 5 upon the occurrence of abnormal circuit conditions, I provide a plurality of relays 6, 7 and 8, one for each conductor of the circuit and of the type comprising cooperating current and potential windings or coils 9 and 10 respectively which are arranged to control a circuit controlling member 11 with a time action dependent on the distance between the relay location and the fault point. Such relays, as is well known to the art, are distributed along the circuit at suitable points such as distributing stations and the like, so that upon the occurrence of a fault, the relays nearest the fault operate first and isolate the section between them without interfering with the continuity of service on the sound sections of the circuit. The current windings 9 of the relays 6, 7 and 8 are in series relation with the respective circuit conductors 1, 2 and 3 through current transformers 12, 13 and 14, the secondary windings of which are connected in parallel by the conductor 15.

For controlling the energization of the potential windings 10, I provide means such as a relay 16 arranged selectively to connect the potential windings for energization in accordance with the potential most affected by a fault. The relay 16 has its energizing winding in series relation with the conductor 15 so as to be energized in accordance with the sum of the currents in the conductors 1, 2 and 3 and controls contacts 17, 18, 19, 20, 21 and 22, the first three being closed when the relay 16 is deenergized and the last three being closed when the relay 16 is energized. These contacts are arranged in circuit with the potential coils 10 and the secondary windings of a potential transformer 23 having the neutral of its primary windings grounded, so that when the contacts 20, 21 and 22 are closed, the potential coils 10 of the relays 6, 7 and 8 are energized in accordance with the potentials to ground of the conductors 1, 2 and 3 respectively. When the relay 16 is deenergized and contacts 17, 18 and 19 are closed, the contacts 17 connect the potential coil 10 of the relay 6 for energization in accordance with the potential between the conductors 1 and 2; the contacts 18 connect the potential coil 10 of relay 7 for energization in accordance with the potential between the conductors 2 and 3, and the contacts 19 connect the potential coil 10 of the relay 8 for energization in accordance with the potential between the conductors 1 and 3.

Normally the sum of the currents in the conductors 1, 2 and 3 is zero and the relay 16 will be in the position shown. Then the potential coils 10 will be energized in accordance with the respective potentials between conductors as set forth in the preceding paragraph. Upon the occurrence of a fault involving two or more conductors, for example 1 and 2, but without fault current to ground, the sum of the currents in the conductors 1, 2 and 3 is zero and no current flows in the conductor 15. Consequently the contacts 17, 18 and 19 remain closed and the potential coil 10 of relay 6 is energized in accordance with the potential between the conductors 1 and 2, the potential most affected by the fault while the current coil 9 of relay 6 is energized in accordance with the current, which includes the fault current in conductor 1. The relay 6, therefore, is energized in accordance with the electric conditions most affected by the fault and operates with the desired discriminating action to control its circuit controlling member 11 which is arranged to control the circuit of the trip coil 5.

Upon the occurrence of a fault to ground on one of the conductors, for example conductor 3, the sum of the currents in the conductors 1, 2 and 3 differs from zero. In this case the sum of the currents or a current proportional thereto flows in the conductor 15. The relay 16, therefore, is energized and picks up in response to current above a predetermined value to close the contacts 20, 21 and 22. This connects the potential coils 10 of the relay 6, 7 and 8 for energization in accordance with the potential to ground of the respective conductors with which the current windings 9 of these relays are associated. Consequently, the potential coil 10 of the relay 8 is connected for energization in accordance with the potential to ground of conductor 3, the potential most affected by the fault while the current winding 9 of relay 8 is energized in accordance with the current, which includes the fault current, in conductor 3. The relay 8, therefore, is energized in accordance with the electric conditions most affected by the fault and operates with the desired discriminating action to control its circuit controlling member 11 which is arranged to control the circuit of the trip coil 5.

While I have shown and described only one embodiment of my invention, I do not desire to be limited to the exact arrangement shown and described, but seek to cover all those modifications that fall within the true spirit and scope of my invention as defined in the appended claims.

What I claim as new and desire to secure by Letters Patent of the United States is:—

1. A protective system for an electric circuit comprising a relay having a current and a potential winding and means arranged normally to connect said potential winding for energization in accordance with the potential between two of the conductors of said circuit, and operative in response to a fault to ground on one of the conductors of the circuit to connect said potential winding for energization in accordance with the potential to ground of the grounded conductor.

2. A protective system for an electric circuit comprising a relay having a current and a potential winding and a relay having a winding connected to be energized in accordance with the sum of the currents in the conductors of the circuit and arranged normally to connect said potential winding for energization in accordance with the potential between two of the conductors of the circuit, and operative in response to a fault to ground on one of said two conductors of the circuit to connect said potential winding for energization in accordance with the potential to ground of the grounded conductor.

3. In a protective system for a polyphase electric circuit, a plurality of relays, one for each phase conductor of the circuit, each having a current winding in series relation with the respective phase conductor and a potential winding, and a relay operative in response to a fault to ground on one of the phase conductors of the circuit to connect each of said potential windings for energization in accordance with the potentials to ground of the respective phase conductors.

4. A protective system for an electric circuit comprising a relay having cooperating current and potential windings, and means comprising a winding connected to be energized in accordance with the sum of the currents in the conductors of the circuit and arranged normally to connect said potential winding for energization in accordance with the potential between two of the conductors of the circuit, and operative in response to a fault to ground on one of the conductors of the circuit to connect said potential winding for energization in accordance with the potential to ground of the grounded conductor.

5. A protective system for an electric circuit comprising a relay having a potential winding and means arranged to be actuated on the occurrence of a fault to ground on one of the conductors of the circuit and to connect said potential winding for energization in accordance with the potential to ground of the grounded conductor.

In witness whereof, I have hereunto set my hand this 2nd day of February, 1925.

JOSEF BIERMANNS.